Patented Oct. 23, 1928.

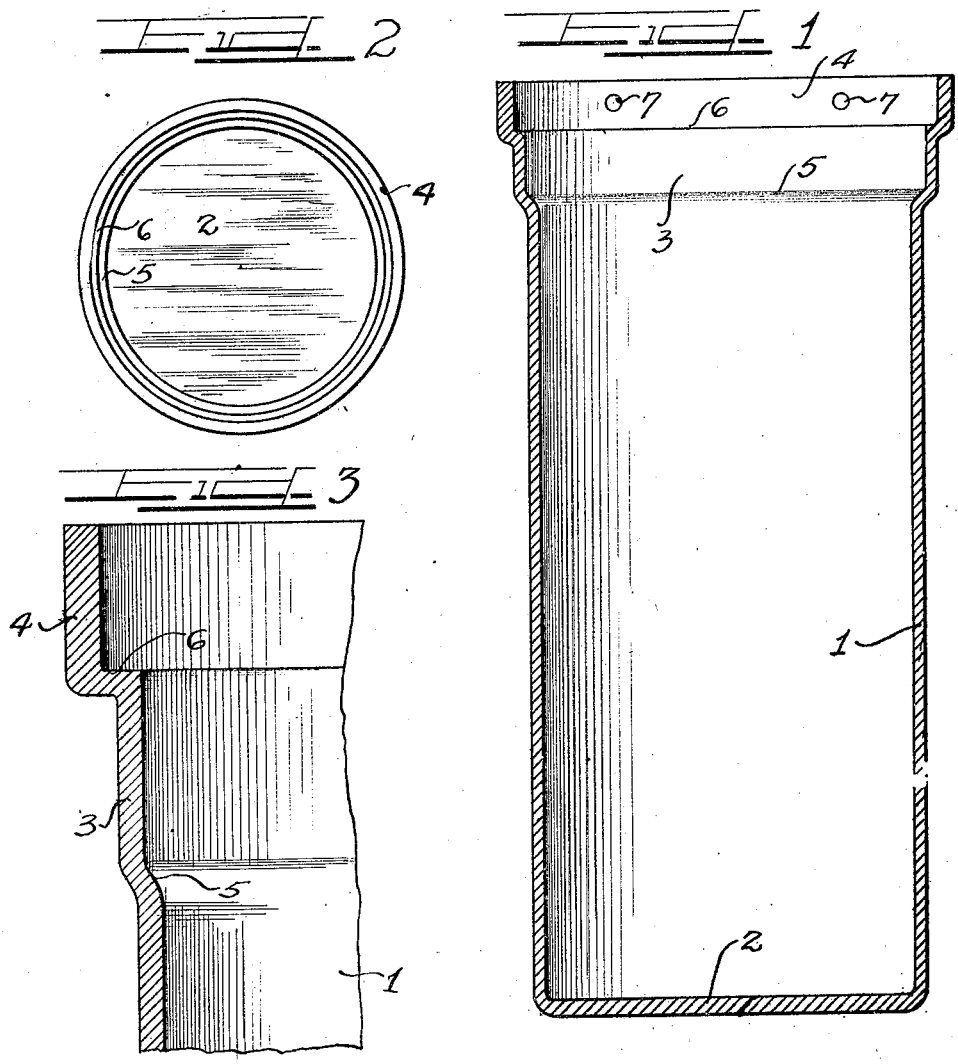

1,688,999

UNITED STATES PATENT OFFICE.

JAMES HALL TAYLOR, OF CHICAGO, ILLINOIS.

METHOD OF MAKING ANNEALING POTS.

Application filed January 12, 1925. Serial No. 1,810.

This invention relates to annealing pots and the method of making the same and has particularly to do with the provision of an improved type of container for material which is to be subjected to heat for annealing purposes.

The material to be annealed is ordinarily placed in such containers through the open end thereof, said end being sealed with clay or other suitable sealing material prior to placing the container in the annealing furnace. Due to the fact that such containers must necessarily be handled by mechanical conveying means it is desirable, in order to assure durability, that the ends thereof be made of heavier material and that said ends be securely joined to the body of the container.

End portions which have heretofore been generally provided have been secured to the walls of the container by welding or riveting. Structures embodying such constructions have, however, proven expensive to manufacture and short lived.

It is an object, therefore, of the present invention to provide an annealing pot which overcomes previously existing disadvantages and which fulfills the above requirements in a satisfactory manner by virtue of its improved construction.

It is also an important object of this invention to provide an annealing pot of the character described wherein certain portions are reinforced by upsetting the material from which the container is made.

Other and further important objects of this invention will be apparent from the disclosures in the specification and accompanying drawings.

The invention, in a preferred form, is illustrated on the drawings and hereinafter more fully described.

On the drawings:

Figure 1 is a central vertical section taken through an annealing pot constructed in accordance with the teachings of the present invention.

Figure 2 is a top plan view of the annealing pot.

Figure 3 is a fragmentary detail section showing the outwardly flared and upset seal-receiving portion.

As shown on the drawings:

The reference numeral 1 indicates the body portion of the container which is preferably constructed of material such as wrought steel which is formed into a large tubular member by forming and welding and which has secured to one end thereof by welding or other suitable means a bottom portion 2 which is of thicker material than the walls of the body portion 1.

The open end of the body portion 1 is provided with outwardly flared portions 3 and 4 which are formed by rolling or otherwise suitably treating the walls of the said body portion 1. Said portions 3 and 4 are preferably substantially parallel with the walls of the body portion 1, the outward flaring of said walls serving to afford shoulders 5 and 6 upon which a sealing material such as clay may be conveniently supported.

After the portions 3 and 4 have been formed by flaring the same outwardly to a desired position the portion 3 is preferably held between suitable dies and the portion 4 increased in thickness by compressing the same in a direction parallel to the axis of the body portion 1. Thus the portion 4 is formed from the walls of the body portion 1 by a process of upsetting into a portion which is materially thicker and sufficiently strong to withstand rough treatment, such as the grappling thereof by crane hooks and the like.

To facilitate the engagement of crane hooks or suitable conveying means with said portion 4, said portion is preferably provided with a plurality of apertures 7 as shown in Figure 1.

Annealing pots such as I have described herein are well adapted to contain wire or similar material which is placed therein during the time that it is subjected to the annealing heat and since such receptacles are of very large size and designed to carry large loads, it is desirable that they be strong and at the same time of simple construction. Such requirements are fulfilled by the annealing pot of this invention wherein the flared open end is integrally formed from the walls of the container; thus eliminating undesirable joints or securing means adjacent said open end and at the same time being of thicker material to withstand rough usage by virtue of the upset portions 4.

By constructing an annealing pot according to my invention it is also possible to provide a structure which is of relatively light weight and at the same time sufficiently strong for the purpose required.

I am aware that details of construction and the method of carrying out the teachings of my invention may be varied through a considerable range without departing from the principles thereof and I therefore do not purpose limiting the patent granted hereon, otherwise than necessitated by the prior art.

I claim as my invention:

The method of making an annealing pot which consists in forming a tubular member with an upper enlarged section, and compressing said enlarged section in the direction of the axis of said pot to materially thicken such enlarged section.

In testimony whereof I have hereunto subscribed my name.

JAMES HALL TAYLOR.